(12) United States Patent
Biezenbos et al.

(10) Patent No.: US 11,260,647 B2
(45) Date of Patent: Mar. 1, 2022

(54) APPARATUS AND METHOD FOR DECOUPLING AN ELEMENT THAT IS BONDED TO A SURFACE BY ADHESIVE

(71) Applicant: Gulfstream Aerospace Corporation, Savannah, GA (US)

(72) Inventors: Kyle Biezenbos, Savannah, GA (US); Blake Edwards, Savannah, GA (US); Christopher A. Gay, Savannah, GA (US); Jeremy Greene, Savannah, GA (US); Gerald Lee, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/946,799

(22) Filed: Jul. 7, 2020

(65) Prior Publication Data
US 2022/0009218 A1    Jan. 13, 2022

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *Y10T 156/1184* (2015.01); *Y10T 156/1967* (2015.01)

(58) Field of Classification Search
CPC . B32B 43/006; B32B 38/10; Y10T 156/1184; Y10T 156/1967
See application file for complete search history.

(56) References Cited

U.S. PATENT DOCUMENTS

| | | | | |
|---|---|---|---|---|
| 4,003,525 A | * | 1/1977 | Podvin | B65H 49/26 242/420.6 |
| 5,144,513 A | * | 9/1992 | Gadsby | G11B 23/502 15/DIG. 13 |
| 6,832,538 B1 | * | 12/2004 | Hwang | B26D 1/46 83/651.1 |
| 9,151,267 B2 | * | 10/2015 | Hine | G05D 1/0206 |
| 2003/0089214 A1 | * | 5/2003 | Fukuta | B23D 57/0053 83/651.1 |
| 2009/0183615 A1 | * | 7/2009 | Sampica | B32B 43/006 83/651.1 |

(Continued)

FOREIGN PATENT DOCUMENTS

| | | |
|---|---|---|
| WO | 2004000511 A2 | 12/2003 |
| WO | 2004000511 A3 | 3/2004 |
| WO | 2020079600 A1 | 4/2020 |

*Primary Examiner* — Mark A Osele
*Assistant Examiner* — Nickolas R Harm
(74) *Attorney, Agent, or Firm* — LKGlobal|Lorenz & Kopf, LLP

(57) ABSTRACT

Apparatuses and methods for decoupling an element that is bonded to a surface by an adhesive are provided. In one example, the apparatus includes a body, a first spool that is rotationally coupled to the body, and a cable having a first cable end portion that is coupled to the first spool, a second cable end portion that is coupled to the body, and a cable intermediate portion that is disposed between the first cable end portion and the second cable end portion. The apparatus is configured to be positioned adjacent to at least one of the element and the surface with the cable intermediate portion disposed adjacent to the adhesive such that when the first spool is rotated, the cable wraps about the first spool, thereby pulling the cable intermediate portion through the adhesive.

18 Claims, 7 Drawing Sheets

(56) References Cited

U.S. PATENT DOCUMENTS

| | | |
|---|---|---|
| 2009/0283214 A1 | 11/2009 | Nelson |
| 2011/0023672 A1* | 2/2011 | Blanchard ............ B32B 43/006 83/15 |
| 2011/0180218 A1* | 7/2011 | Ciliberti ................ G02F 1/1303 156/705 |
| 2014/0102145 A1* | 4/2014 | Teck ..................... G02F 1/1303 65/112 |
| 2016/0031106 A1* | 2/2016 | Wu ..................... G02F 1/13338 83/15 |

* cited by examiner

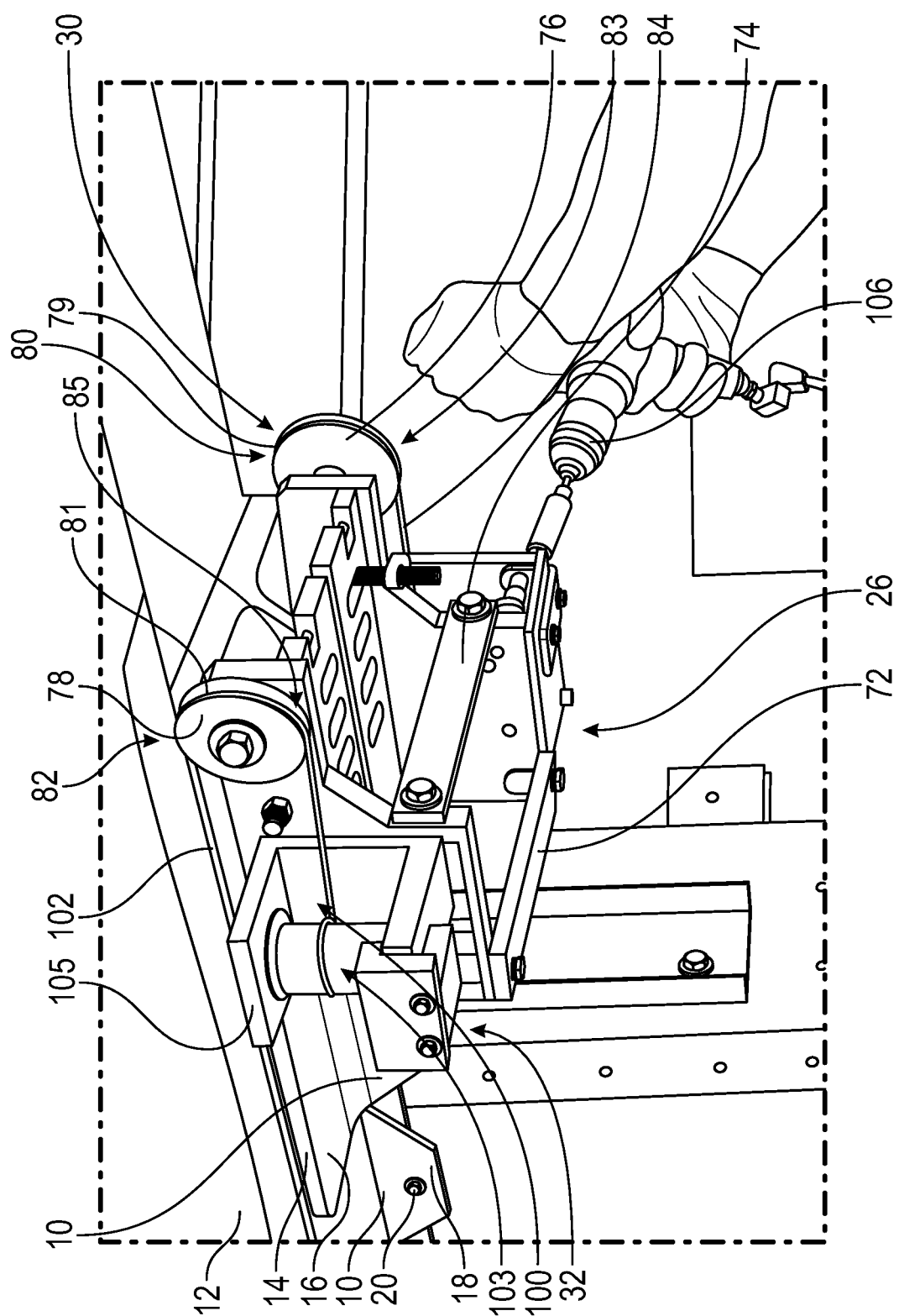

APPARATUS AND METHOD FOR DECOUPLING AN ELEMENT THAT IS BONDED TO A SURFACE BY ADHESIVE

TECHNICAL FIELD

The technical field relates generally to separating or decoupling adhesively bonded articles, structures, elements and/or surfaces, and more particularly, relates to apparatuses and methods for decoupling an element(s) that is bonded to a surface, for example a vehicle surface or the like, by adhesive.

BACKGROUND

Adhesives are commonly used to bond surfaces of articles, structures, elements or the like together. For example, sealants (e.g., thermosetting polysulfide sealants or the like) or other thermosetting elastomeric adhesives are a type of adhesive that can be applied and subsequently cured to provide a very tough, high-strength bond between surfaces. This high-strength bonding is especially useful in preventing bonded constructions from coming apart, even in response to an applied load(s) that produces, for example, high tensile stresses and/or shear stresses.

However, because adhesives such as sealants or other thermosetting elastomeric adhesives provide such strong bonds between surfaces, if for some reason the surfaces need to be separated, it is often a challenge to subsequently sever the adhesive bond to decouple the surfaces after the adhesive has been applied and fully cured. Harsh liquid chemicals such as organic solvents and/or sharp tools such as utility knives (e.g., X-Acto knives and/or blades) or the like are often used to dissolve, soften, remove, and/or cut through the adhesive to sever the bond and decouple the surfaces. Unfortunately, these approaches can damage the bonded or adjacent surfaces, require protective gloves or respirators, and/or fatigue workers as such removal processes can be quite labor-intensive.

For example, it is known for a sealant adhesive to be used to bond T-shaped metal structures or elements to the outer skin surfaces of an aircraft such as wings, horizontal stabilizers, vertical stabilizers, control surfaces, or the like. In addition to being bonded to the aircraft surfaces, groups of adjacent T-shaped metal elements are also connected to a corresponding beam to form a beam construction commonly referred to as a whiffletree. The whiffletree can be operatively coupled to a mechanical device(s) such as a jack(s) or hydraulic cylinder(s) for tension and compression testing of the aircraft surfaces. This heavy load testing requires the use of high-strength adhesives to bond the metal T-shaped elements to the aircraft surfaces, making it difficult for workers to remove the elements after testing is complete, especially without incurring damage to the outer skin surfaces of the aircraft. Although organic solvents may help to soften or partially dissolve the cured sealant adhesive, the solvent can also remove or damage any paint on the outer skin surface of the aircraft and/or damage intentionally sealed aircraft parts. Also, the use of aggressive organic solvents to attack the adhesive, may require the workers to wear special gear to avoid any chemical exposure to the solvent. Further, using utility cutting tools such as X-Acto® knives and/or blades to sever the bond and decouple the elements from the outer skin surfaces of the aircraft is cumbersome and labor intensive for workers.

Accordingly, it is desirable to provide apparatuses and methods for decoupling elements that are bonded to a surface by adhesive that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an apparatus and a method for decoupling an element that is bonded to a surface by adhesive are provided herein.

In a first non-limiting embodiment, the apparatus includes, but is not limited to, a body. The apparatus further includes, but is not limited to, a first spool that is rotationally coupled to the body. The apparatus further includes, but is not limited to, a cable having a first cable end portion that is coupled to the first spool, a second cable end portion that is coupled to the body, and a cable intermediate portion that is disposed between the first cable end portion and the second cable end portion. The apparatus is configured to be positioned adjacent to at least one of the element and the surface with the cable intermediate portion disposed adjacent to the adhesive such that when the first spool is rotated, the cable wraps about the first spool, thereby pulling the cable intermediate portion through the adhesive.

In another non-limiting embodiment, the method includes, but is not limited to, positioning an apparatus adjacent to at least one of the element and the surface. The apparatus includes a body, a spool that is rotationally coupled to the body, and a cable. The cable has a first cable end portion that is coupled to the spool, a second cable end portion that is coupled to the body, and a cable intermediate portion that is disposed between the first cable end portion and the second cable end portion. The method further includes, but is not limited to, rotating the spool such that the cable wraps around the spool, thereby pulling the cable intermediate portion through the adhesive.

BRIEF DESCRIPTION OF THE DRAWINGS

The various embodiments will hereinafter be described in conjunction with the following drawing figures, wherein like numerals denote like elements, and wherein:

FIG. 4 illustrates another perspective side view of the apparatus depicted in FIG. 3;

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for decoupling an element that is bonded to a surface by adhesive. The exemplary embodiments taught herein provide an apparatus that includes a body, a spool that is rotationally coupled to the body, and a cable having a first cable end portion that is coupled to the spool, a second cable end portion that is coupled to the body, and a cable intermediate portion that is disposed between the first cable end portion and the second cable end portion. The apparatus is configured to be positioned adjacent to the element and/or the surface with the cable intermediate portion disposed adjacent to the adhesive such that when the spool is rotated, the cable wraps around the spool, thereby pulling the cable intermediate portion through the adhesive.

In an exemplary embodiment, advantageously, by pulling the cable intermediate portion through the adhesive, the apparatus efficiently and effectively decouples the element from the surface without the need for labor-intensive efforts by workers. In one example, one worker operates the apparatus to pull the cable intermediate portion through the adhesive to decouple one or more elements from the surface while another worker collects the one or more decoupled element(s) as they fall or otherwise separate from the surface. As such, there is no need for the use of chemical solvents that can damage the element and/or the surface, and/or there is no need for the use of more labor-intensive manual processes that employ utility tools or the like that are ergonomically taxing on the workers.

Figure 1:
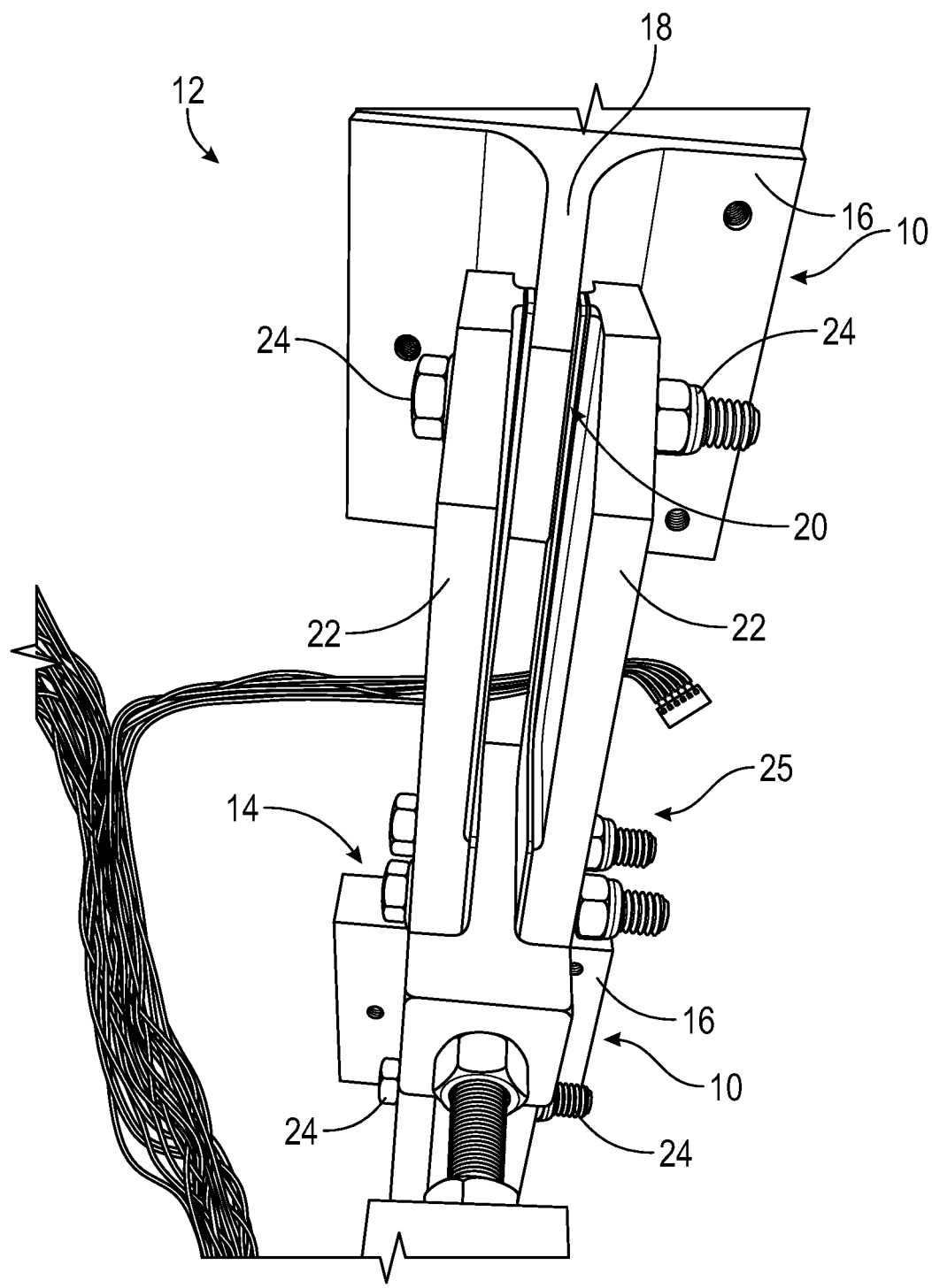
FIG. 1 illustrates a perspective bottom view of elements that are bonded to a surface by adhesive in accordance with exemplary embodiments.

FIG. 1 illustrates a perspective bottom view of elements 10 that are bonded to a surface 12 by adhesive 14. In an exemplary embodiment, the surface 12 is a vehicle surface, for example, an aircraft surface such as the underside of an aircraft wing, a portion of a fuselage, or the like. The adhesive 14 may be in the form of an adhesive pad or layer and each element 10 may be bonded to the surface 12 by a distinct or separate adhesive pad or layer. Alternatively, a plurality of elements 10 may collectively be bonded to the surface 12 by a single continuous adhesive layer.

As illustrated, the elements 10 are made of metal and have a general T-shape extruded form. For example, each of the elements 10 includes a plate portion 16 that is bonded to the surface 12 via the adhesive 14 and a rib portion 18 that extends from the plate portion 16 in a direction generally away from the surface 12. The rib portion 18 has an aperture 20 formed therethrough that allows for additional devices and/or constructions to be removably coupled to one or more of the element(s) 10. As illustrated, pairs of metal beams 22 are removably coupled to the elements 10 via fasteners 24 that extend through the apertures 20 and form a whiffletree construction 25. The whiffletree construction(s) 25 can be operatively coupled to a mechanical device(s) such as a jack(s) or hydraulic cylinder(s), for example, for distributing force substantially equally between the elements 10 for transfer through the adhesive 14 to the surface 12 for aircraft performance testing.

Figure 2:
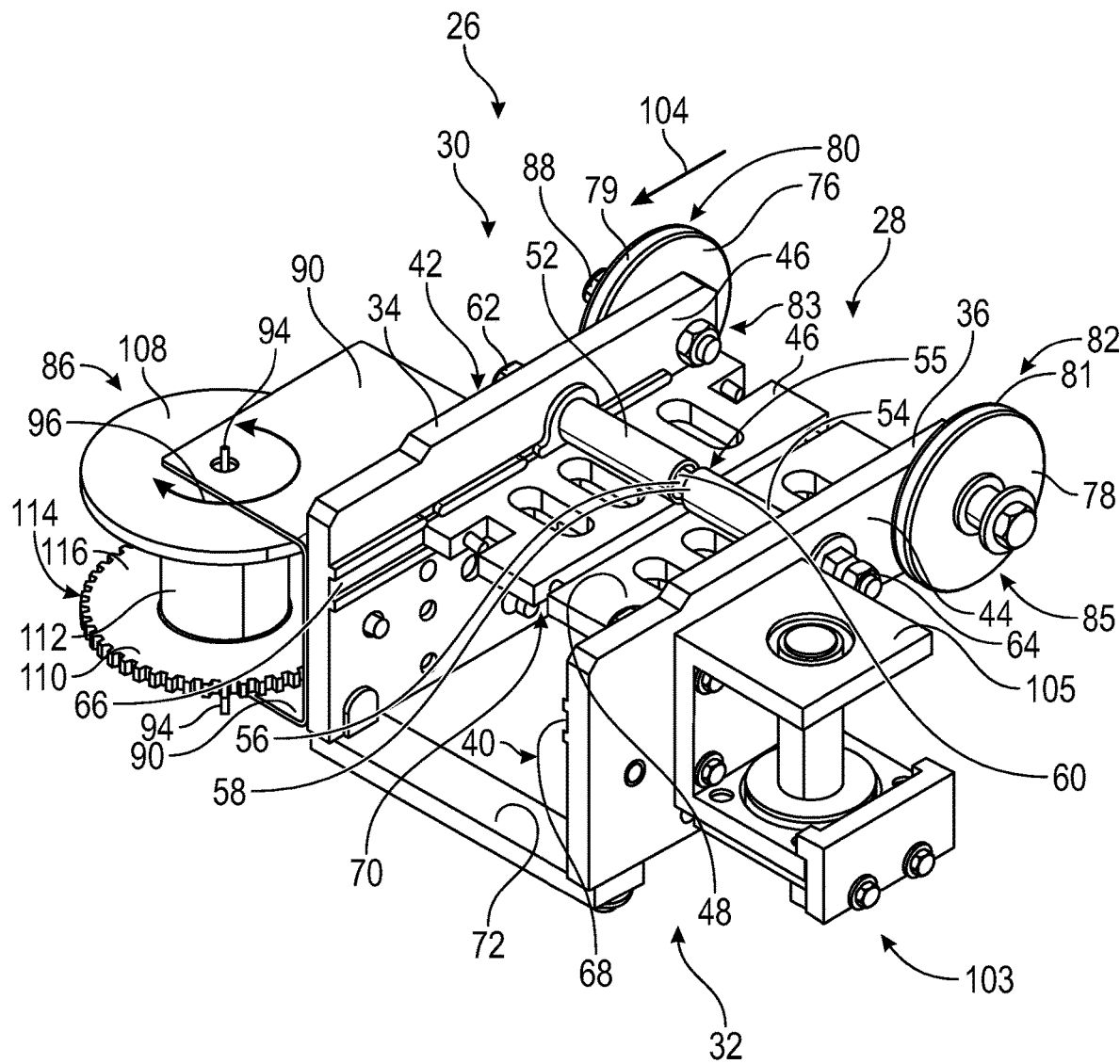
FIG. 2 illustrates a perspective view of an apparatus for decoupling an element that is bonded to a surface by adhesive in accordance with an exemplary embodiment.
Figure 5A:
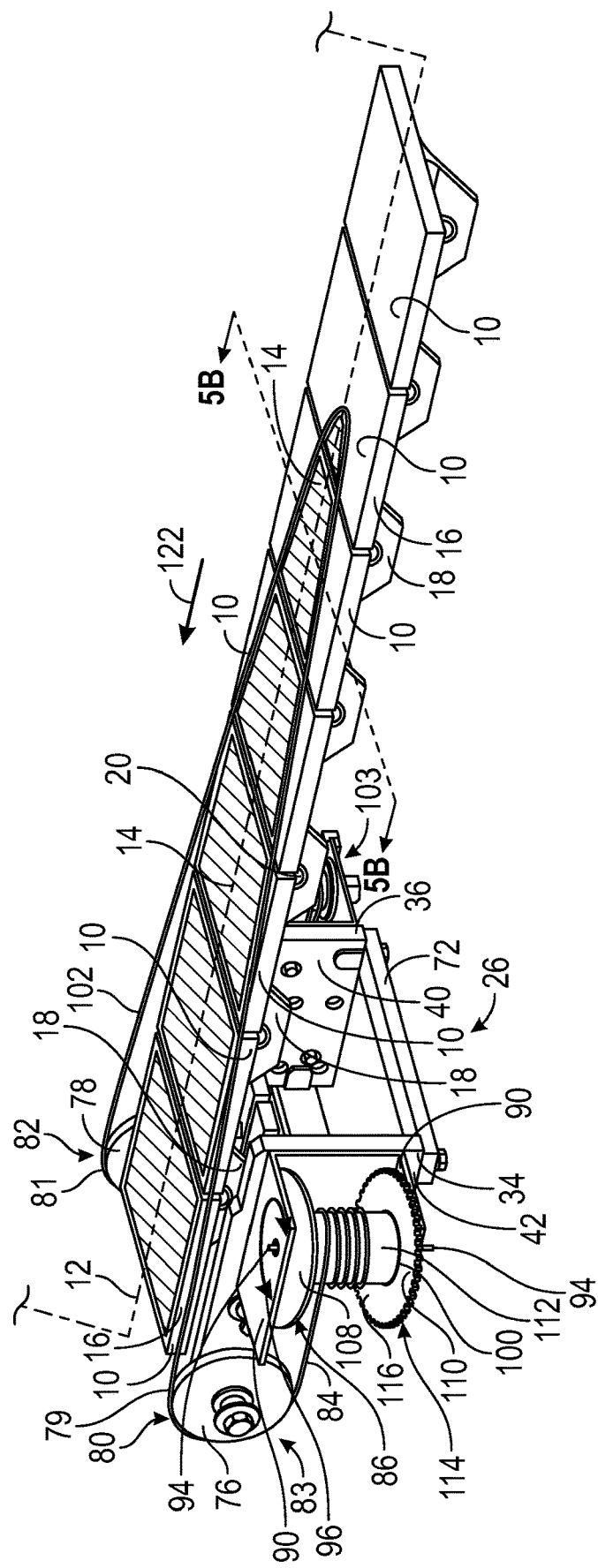
FIG. 5A illustrates a perspective view of an apparatus that is coupled to an element of a plurality of elements that are bonded to a surface by adhesive in accordance with an exemplary embodiment.

Referring to FIGS. 2 and 5A, in an exemplary embodiment, the metal beams 22 illustrated in FIG. 1 are removed from the elements 10, for example, after aircraft performance testing has been completed. An apparatus 26 for decoupling the elements 10 from the surface 12 is disposed adjacent to the surface 12 and, as will be discussed in further detail below, is removably coupled to one of the elements 10.

In an exemplary embodiment, the apparatus 26 includes a body 28 that has a body side portion 30 and a body side portion 32 that is disposed opposite the body side portion 30. The body side portions 30, 32 each includes a wall 34, 36 that are spaced apart from each other. The walls 34 and 36 have surfaces 38 and 40 that face towards each other and surfaces 42 and 44 that face away from and/or opposite each other.

The apparatus 26 includes an attachment member 50 that includes spacers 52 and 54 that are coupled to the walls 34 and 36 and that extend from the surfaces 38 and 40, respectively, towards each other and are spaced apart to define a gap 55 therebetween. In an exemplary embodiment, the spacers 52 and 54 are cylindrically shaped. The spacers 52 and 54 are hollow to define channels or holes 56 and 58 formed therethrough that extend through the walls 34 and 36, respectively. In an exemplary embodiment, the spacers 52 and 54 including the holes 56 and 58 are substantially aligned about a common axis. The attachment member 50 further includes a shaft 60 that is disposed in the holes 56 and 58 extending between the surfaces 42 and 44. The shaft 60 is removably coupled to the body 28 of the apparatus 26 by, for example, fasteners 62 and 64 that when are attached to the ends of the shaft 60, secure the shaft to the body 28 and that when one or both of the fasteners 62 and 64 are removed, allow the shaft 60 to slide or otherwise move through the holes 56 and 58. As such, the apparatus 26 may be attached or otherwise coupled to one of the element 10, for example, by positioning the apparatus 26 with the shaft 60 fully or partially retracted (e.g., fully or partially outside of the holes 56 and 58) and the rib portion 18 disposed between the gap 55 with the aperture 20 and the holes 56 and 58 substantially aligned, then sliding the shaft 60 to extend through the aperture 20 and the holes 56 and 58, and securing the shaft 60 to the body 28 via fasteners 62 and 64.

In an exemplary embodiment, each of the surfaces 38, 40 of the walls 34 and 36 has a track 66, 68 formed therein. As illustrated, the apparatus 26 includes spacers 46 and 48 that are configured as plates or blocks and that are disposed in the tracks 66 and 68, respectively. As such, the spacers 46 and 48 are disposed between the surfaces 38 and 40 of the walls 34 and 36, respectively. In an exemplary embodiment, the spacers 46 and 48 are substantially aligned along a common plane and define a gap 70 therebetween. The spacers 46 and 48 are disposed adjacent to the spacers 52 and 54, respectively, with the gap 70 substantially aligned with the gap 55. As such, the gaps 55 and 70 together form an opening to receive the rib portion 18 of the element 10 for attaching the apparatus 26 to one of the elements 10. In particular and without wishing to be bound by theory, it is believed that the spacers 46 and 48 provide additional stability to the apparatus 26 when it is coupled to the element 10 by providing elongated contact surfaces against opposite sides of the rib portion 18 to limit rotational movement between the apparatus 26 and the element 10 about the shaft 60 and secure the position of the apparatus 26 relative to the corresponding element 10.

Referring also to FIG. 4, in an exemplary embodiment, the apparatus 26 includes brackets 72 and 74 to provide additional support or structure to the body 28 of the apparatus 26. As illustrated, the brackets 72 and 74 are spaced apart from each other, each extending between and coupled to the walls 34 and 36, thereby securing the body side portions 30 and 32 to each other.

In an exemplary embodiment, the apparatus 26 includes pulleys 76 and 78 that are configured as wheels each having an upper pulley area 80, 82 and a lower pulley area 83, 85 and an annular track 79, 81 formed in the rim surrounding the upper and lower pulley areas 80 and 83, 82 and 85. A cable 84 is disposed on the pulleys 76 and 78 in the annular tracks 79 and 81 and is operatively coupled to a spool 86 that is rotationally coupled to the body 28 of the apparatus 26. As illustrated, the pulleys 76 and 78 are coupled to the body side portions 30 and 32, respectively. For example, the pulley 76 is coupled to the wall 34 and the surface 42 faces towards the pulley 76. Similarly, the pulley 78 is coupled to the wall 36 with the surface 44 facing towards the pulley 78. The pulleys 76 and 78 are correspondingly rotationally coupled to the walls 34 and 36 by fasteners 88. In an exemplary embodiment, the pulleys 76 and 78 are substantially aligned about a common axis.

As will be discussed in further detail below, in accordance with an exemplary embodiment, the spool 86 is rotationally coupled to the body side portion 30 adjacent to the pulley 76 with the surface 42 facing towards the spool 86. As illustrated, a bracket 90 (e.g., "U-shaped" bracket) is coupled to the body side portion 30 and extends from the surface 42 of the wall 34. The spool 86 is disposed between flanges of the bracket 90 and is rotationally coupled to the bracket 90 by a pin 94 that extends through the center of the spool 86 and is coupled to the flanges of the bracket 90. As such, the spool 86 is configured to rotate in directions (indicated by double headed arrow 96) about the pin 94.

In an exemplary embodiment, the apparatus 26 includes a spool 103 that is coupled to the body side portion 32. As illustrated, the spool 103 is disposed adjacent to the pulley 78 with the surface 44 facing towards the spool 103. In an exemplary embodiment, the spool 103 is fixedly coupled to the body side portion 32 to prevent rotation of the spool 103. For example, the spool 103 may be coupled to the wall 36 by a bracket 105 (e.g., "U-shaped" bracket) that is coupled to and extends from the surface 44 of the wall 36.

With continuing reference to FIGS. 2 and 5A, the cable 84 has a cable end portion 98 that is coupled to the spool 86, a cable end portion 100 that is coupled to the body side portion 32, and a cable intermediate portion 102 that is disposed therebetween. In an exemplary embodiment, the cable end portion 100 is coupled to the spool 103. In an exemplary embodiment, the pulleys 76 and 78 are cooperatively configured to position the cable intermediate portion 102 substantially level with the adhesive 14 when the apparatus 26 is coupled to the element 10. The cable intermediate portion 102 extends from the upper pulley areas 80 and 82 generally in a direction (indicated by single-headed arrow 104) to wrap at least partially around the adhesive 14. The cable 84 is guided from the upper pulley areas 80 and 82 to the lower pulley areas 83 and 85 by wrapping around the annular tracks 79 and 81, respectively. Further, the cable 84 is guided from the lower pulley areas 83 and 85 to the spools 86 and 103, respectively, generally in the direction 104.

Figure 3:
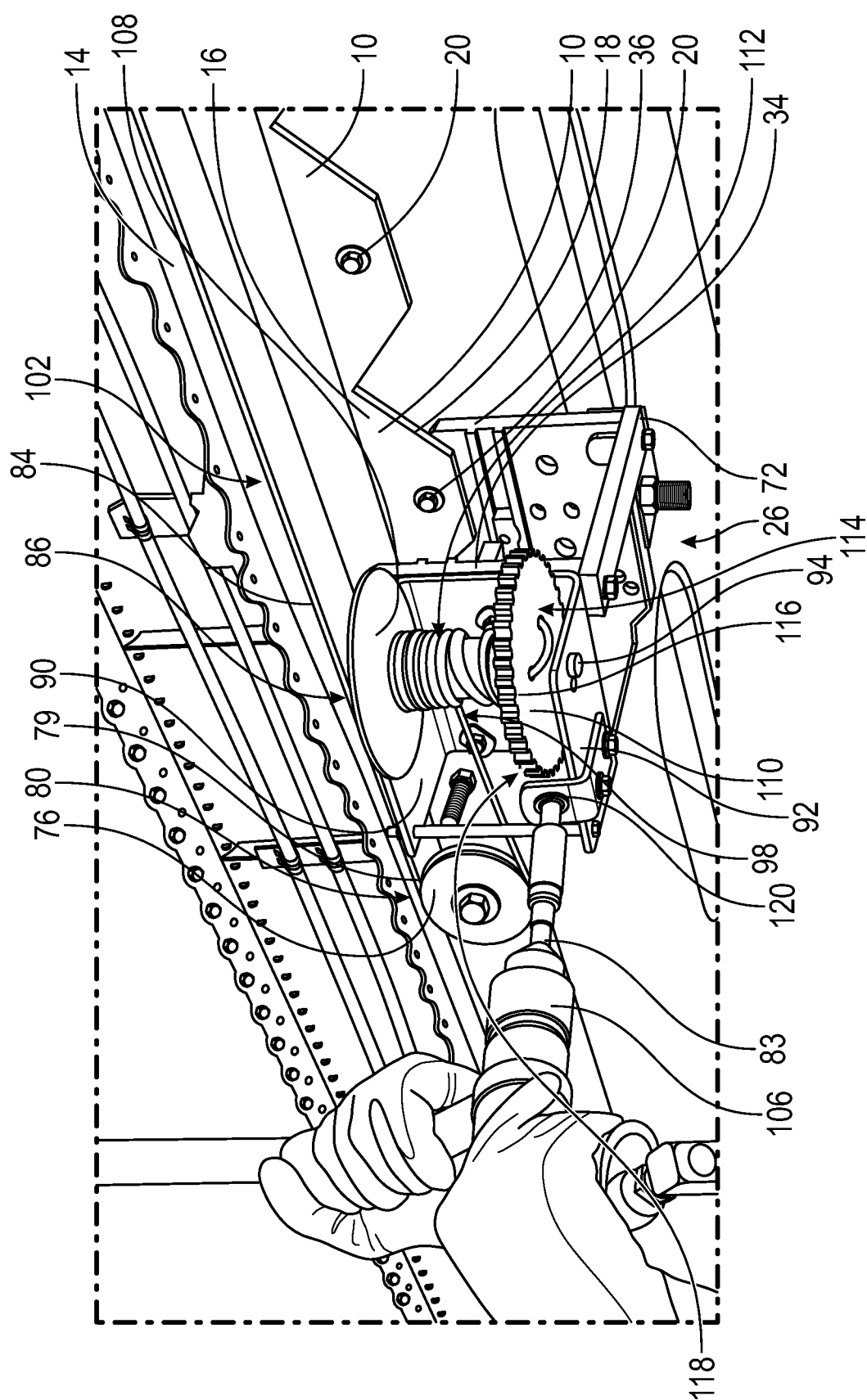
FIG. 3 illustrates a perspective side view of an apparatus that is coupled to an element that is bonded to a surface by adhesive in accordance with an exemplary embodiment.

Referring also to FIGS. 3 and 4, the spool 86 is configured to be rotated by a driver 106. In an exemplary embodiment, the spool 86 includes flanges 108 and 110 and a drum 112 that is disposed between the flanges 108 and 110. As illustrated, the flange 110 includes teeth 114 disposed on the outer periphery thereof and is configured as a gear 116. Although the flange 110 is illustrated as being configured as a gear 116, various alternate embodiments of the spool 86 include the flange 110 as not being configured as a gear and a separate gear 116 being coupled to the spool 86 either directly or indirectly to cause rotation of the drum 112. In an exemplary embodiment, the cable end portion 98 is coupled to the drum 112.

In an exemplary embodiment, the apparatus 26 includes a gear 118 that has a threaded portion that couples with the gear 116 and a receiver portion 120 that is configured to receive the driver 106 to rotate the gear 118. As illustrated, the gear 116 is configured as a worm gear and the gear 118 is configured as a worm. As such, the gears 116 and 118 cooperate as a worm drive. When the driver 106 rotates the gear 118, the threaded portion of the gear 118 meshes with the teeth 114 of the gear 116, thereby rotating the gear 116 and, consequently, rotating the spool 86.

Figure 5B:
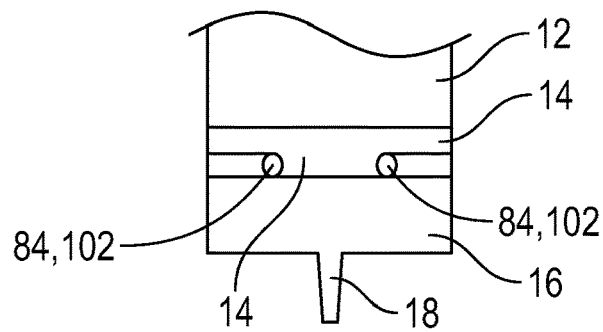
FIG. 5B is a cross-sectional view of a portion of the apparatus disposed between one of the elements and the surface depicted in FIG. 5A along line 5B-5B.

Referring also to FIG. 5B, when the apparatus 26 is coupled to the element 10 such that the apparatus 26 is positioned adjacent to the surface 12 and the cable intermediate portion 102 is wrapped around the adhesive 14 and the driver 106 rotates the spool 86, the cable 84 progressively wraps around the drum 112, thereby pulling the cable intermediate portion 102 in a direction (indicated by single headed arrow 122) through the adhesive 14. In an exemplary embodiment, the adhesive 14 is thicker than the diameter of the cable 84 such that when the cable 84 is pulled through the adhesive 14, the cable 84 does not contact with the surface 12 to further protect the surface 12 from incurring any damage. Once the adhesive 14 has been cut by the cable 84, the elements 10 are fully decoupled from the surface 12 and may fall or otherwise separate from the surface 12. Any residual adhesive 14 that remains on the surface 12 is now fully exposed and can be more readily accessed for easier removal by a worker(s) than with the elements 10 in place adhesively bonded to the surface 12.

Figure 7:
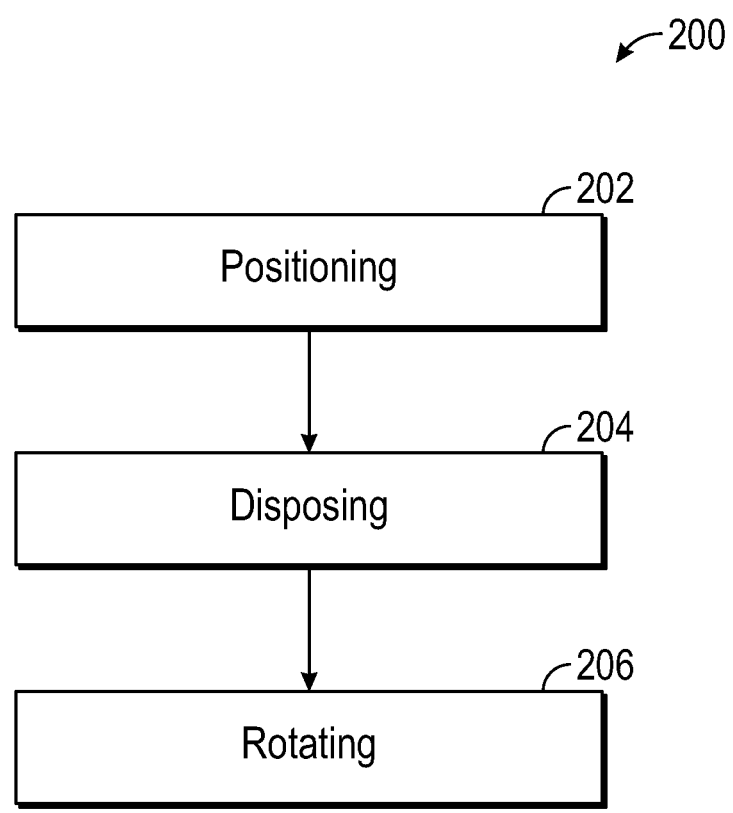
FIG. 7 illustrates a block diagram of a method for decoupling an element that is bonded to a surface by adhesive in accordance with an exemplary embodiment.

Referring to FIG. 7, a method 200 for decoupling an element that is bonded to a surface by adhesive is provided. The method 200 includes positioning (STEP 202) an apparatus adjacent to at least one of the element and the surface. The apparatus includes a body, a spool that is rotationally coupled to the body, and a cable having a first cable end portion that is coupled to the first spool, a second cable end portion that is coupled to the body, and a cable intermediate portion that is disposed between the first cable end portion and the second cable end portion. The cable intermediate portion is disposed (STEP 204) adjacent to the adhesive. The spool is rotated (STEP 206) such that the cable wraps around the spool, thereby pulling the cable intermediate portion through the adhesive.

Figure 6:
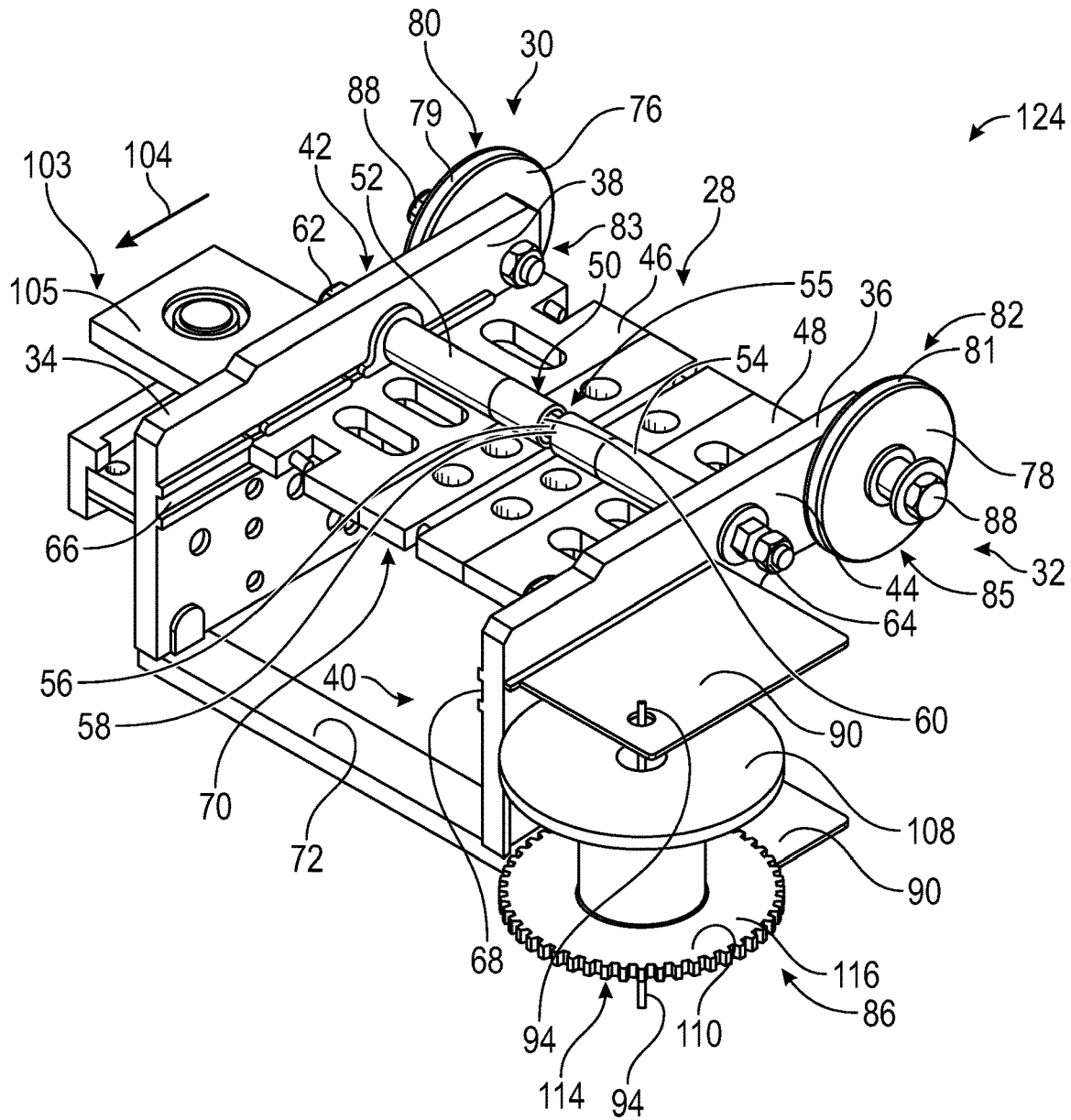
FIG. 6 illustrates a perspective view of an apparatus for decoupling an element that is bonded to a surface by adhesive in accordance with an exemplary embodiment.

Referring to FIG. 6, another exemplary embodiment of the apparatus 124 is provided. The apparatus 124 is similarly configured to the apparatus 26, but with the exception that the spool 86 is rotationally coupled to the body side portion 32 via bracket 90 and the spool 103 is fixedly coupled to the body side portion 30 via bracket 105. Further, spacers 146 and 148 depicted in FIG. 6 are wider than the spacers 46 and 48 depicted in FIG. 2.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for decoupling an element that is bonded to a surface by adhesive, the apparatus comprising:
 a body;
 an attachment member that is coupled to the body and that is positionally fixed relative to the body, wherein the attachment member is configured to removably couple to at least one of the element and the surface;
 a first spool that is rotationally coupled to the body; and
 a cable having a first cable end portion that is coupled to the first spool, a second cable end portion that is coupled to the body, and a cable intermediate portion that is disposed between the first cable end portion and the second cable end portion, wherein the apparatus is configured to be positioned adjacent to at least one of the element and the surface with the cable intermediate portion disposed adjacent to the adhesive such that when the first spool is rotated, the cable wraps about the first spool, thereby pulling the cable intermediate portion through the adhesive, and wherein the apparatus further includes a first pulley that is coupled to the body adjacent to the first spool and that is configured to position the cable intermediate portion substantially level with the adhesive and to guide the cable to the first spool as the first spool rotates.

2. The apparatus of claim 1, wherein the apparatus further includes a first gear that is coupled to the first spool to rotate the first spool as the first gear rotates.

3. The apparatus of claim 2, wherein the apparatus further includes a second gear that meshes with the first gear to rotate the first gear.

4. The apparatus of claim 3, wherein the second gear has a threaded portion that meshes with the first gear and a receiver portion that is configured to receive a driver to rotate the second gear.

5. The apparatus of claim 4, wherein the first gear and the second gear are cooperatively configured as a worm drive.

6. The apparatus of claim 1, wherein the body includes a first body side portion and a second body side portion that is disposed opposite the first body side portion, and wherein the first spool is rotationally coupled to the first body side portion, the first pulley is coupled to the first body side portion, and the second cable end portion is coupled to the second body side portion.

7. The apparatus of claim 6, wherein the apparatus further includes a second spool that is coupled to the second body side portion, and wherein the second cable end portion is coupled to the second spool.

8. The apparatus of claim 7, wherein the second spool is fixedly coupled to the second body side portion to prevent rotation of the second spool.

9. The apparatus of claim 7, wherein the apparatus further includes a second pulley that is coupled to the second body side portion adjacent to the second spool to guide the cable to the second spool and that is cooperatively configured with the first pulley to position the cable intermediate portion substantially level with the adhesive.

10. The apparatus of claim 9, wherein the first pulley and the second pulley are substantially aligned about a common axis.

11. The apparatus of claim 9, wherein the cable intermediate portion of the cable extends from the first and second pulleys generally in a first direction to wrap at least partially around the adhesive.

12. The apparatus of claim 11, wherein the first pulley has a first upper pulley area and a first lower pulley area, and the second pulley has a second upper pulley area and a second lower pulley area, and wherein the cable intermediate portion of the cable extends from the first and second upper pulley areas generally in the first direction to wrap at least partially around the adhesive.

13. The apparatus of claim 12, wherein the cable is guided from the first and second lower pulley areas to the first and second spools, respectively, generally in the first direction.

14. The apparatus of claim 9, wherein the first body side portion includes a first wall and the second body side portion includes a second wall that is spaced apart from the first wall.

15. The apparatus of claim 14, wherein the first wall has a first surface that faces towards the first spool and the first pulley and a second surface that is disposed opposite the first surface and faces towards the second wall, and wherein the second wall has a third surface that face towards the second spool and the second pulley and a fourth surface that is disposed opposite the third surface and faces towards the first wall.

16. The apparatus of claim 15, wherein the body includes a first spacer and a second spacer that are disposed between the second and fourth surfaces of the first and second walls, respectively, and that are spaced apart from each other.

17. The apparatus of claim 16, wherein the second surface has a first track formed therein and the fourth surface has a second track formed therein, and wherein the first spacer is disposed in the first track and the second spacer is disposed in the second track.

18. A method for decoupling an element that is bonded to a surface by adhesive, the method comprising the steps of:
 positioning an apparatus adjacent to at least one of the element and the surface, the apparatus comprising:
  a body;
  an attachment member that is coupled to the body and that is positionally fixed relative to the body, wherein the attachment member is configured to removably couple to at least one of the element and the surface;
  a spool that is rotationally coupled to the body; and
  a cable having a first cable end portion that is coupled to the spool, a second cable end portion that is coupled to the body, and a cable intermediate portion that is disposed between the first cable end portion and the second cable end portion;
 disposing the cable intermediate portion adjacent to the adhesive; and
 rotating the spool such that the cable wraps around the spool, thereby pulling the cable intermediate portion through the adhesive, and wherein the apparatus further includes a pulley that is coupled to the body adjacent to the spool and that positions the cable intermediate portion substantially level with the adhesive and guides the cable to the spool as the spool rotates.

* * * * *